US006006657A

United States Patent [19]

Ikuta

[11] Patent Number: 6,006,657

[45] Date of Patent: Dec. 28, 1999

[54] SYSTEM FOR ALLOTTING SOUP WITH INGREDIENTS

[76] Inventor: Kazumasa Ikuta, Green Corp 301, 3-2 Hosiguchi, Kanagawa-Ku, Yokohama, Japan

[21] Appl. No.: 09/267,785

[22] Filed: Mar. 15, 1999

[30] Foreign Application Priority Data

Feb. 5, 1999 [JP] Japan .................................. 11-028134

[51] Int. Cl.$^{6}$ ................................ A23L 1/00; A23L 1/40; A23L 1/0522

[52] U.S. Cl. ................................ 99/331; 99/344; 99/352; 99/355; 99/357; 99/483; 222/1; 222/105; 222/129.1; 222/146.5; 222/135

[58] Field of Search ..................... 99/331–334, 342–344, 99/352–355, 357, 467, 473, 468, 483; 221/82, 101, 150 A, 150 HC, 203; 222/1, 135, 144.5, 146.5, 105, 215, 214, 333, 129.1, 129.2, 146.1, 318, 494, 334, 263, 240, 338, 74, 93, 90, 94; 426/589, 578, 661

[56] References Cited

U.S. PATENT DOCUMENTS

| | | | |
|---|---|---|---|
| 2,682,984 | 7/1954 | Melikian et al. | 99/357 X |
| 3,185,348 | 5/1965 | Pollak et al. | 222/105 X |
| 3,340,790 | 9/1967 | Simjian | 99/352 |
| 3,662,927 | 5/1972 | Cocks | 222/146.5 |
| 4,189,071 | 2/1980 | West | 222/129.1 X |
| 4,357,861 | 11/1982 | Di Girolamo | 99/344 X |
| 4,359,935 | 11/1982 | Murray | 99/331 |
| 4,544,085 | 10/1985 | Frazer | 222/146.5 X |
| 4,603,793 | 8/1986 | Stern | 222/105 |
| 4,671,966 | 6/1987 | Giddey et al. | 426/589 |
| 4,748,902 | 6/1988 | Maurantonio | 99/326 |
| 4,860,923 | 8/1989 | Kirschner et al. | 222/1 |
| 5,178,895 | 1/1993 | Duckworth | 426/589 |

*Primary Examiner*—Timothy Simone
*Attorney, Agent, or Firm*—Armstrong, Westerman, Hattori, McLeland & Naughton

[57] ABSTRACT

The present invention provides a system for allotting soup and ingredients, by which it is possible to allot soup for customers without the possibility of scorching, to provide soup immediately for the customers through simple procedure, and to evenly distribute ingredients and to avoid collapse of initial shape of the ingredients. In the system for allotting soup mixed with approximately constant quantity of ingredients, said system comprises a container for accommodating the soup mixed with ingredients, a device provided in said container and for separating the soup from ingredients, ingredient accommodating device provided at the lower end of said container and for accommodating a predetermined quantity of ingredients, and an accommodating chamber provided on said accommodating device and used for accommodating a predetermined quantity of ingredients, whereby said predetermined quantity of ingredients is dropped through an opening formed on the lower end of said chamber for accommodating the predetermined quantity of ingredients into a space with a predetermined volume provided thereunder, said opening being opened or closed freely.

10 Claims, 3 Drawing Sheets

SYSTEM FOR ALLOTTING SOUP WITH INGREDIENTS

BACKGROUND OF THE INVENTION

The present invention relates to a system for allotting approximately constant quantity of ingredients to soup such as miso soup, curried soup, and other soup and for distributing a predetermined quantity of the soup with ingredients for customers.

In restaurants, dining halls, or factory mess halls, it has been customary that canned food materials such as miso soup, curried soup, corn soup, corn chowder, etc. (10 to 20 liters in volume) as cooked in other places in advance are placed into a big pot and these are kept always in warm condition by heating up constantly and are visually allotted and distributed each in predetermined quantity into containers for customers while stirring up with large spoon or ladle.

As described above, the soup should be always heated up, and it is necessary to stir it up almost constantly in order to prevent scorching. Special staffs must be assigned for this purpose, and this leads to cost increase for the soups due to the increase of personnel expenditure. Moreover, the quantity of ingredients to be mixed in the soup may not be maintained at constant level, and initial shape of the ingredients is often lost due to frequent stirring.

In some cases, the soup is not heated up at all times, but it is heated up each time before it is served to the customers. In this case, a certain time is required before the soup is fully heated up, and this causes inconveniences for the customers.

SUMMARY OF THE INVENTION

To solve the above problems, it is an object of the present invention to provide a system for allotting and distributing soup and ingredients, by which it is possible to offer soup with ingredients for the customer by merely serving each time it is offered to the customer and also to evenly distribute the quantity of the ingredients to be mixed in the soup.

It is another object of the present invention to provide a system for allotting and distributing, by which it is possible to offer soup with ingredients to the customers by preventing scorching of the soup and by avoiding collapse of initial shape of the ingredients.

Further, it is another object of the present invention to provide a system for allotting and distributing soup with ingredients, for which no level switch is required.

Further, it is still another object of the present invention to provide a system for allotting soup and ingredients, in which a volumetric tube can be smoothly rotated even when the soup is heated up to high temperature.

To attain the above objects, the system for allotting soup containing approximately constant quantity of ingredients according to the present invention comprises a container for accommodating the soup with ingredients, means for separating soup and ingredients (may be mixed with soup) in the container, means provided at the lower end of the container and used for accommodating a predetermined quantity of ingredients, and an ingredient accommodating chamber provided in the accommodating means and used for accommodating a predetermined quantity of ingredients, whereby the predetermined quantity of ingredients is dropped down through an opening formed at the lower end of the chamber for accommodating the predetermined quantity of ingredients into a space of a predetermined volume positioned thereunder, and the opening is opened or closed freely.

For the soup accommodating chamber, a plurality of heaters for heating up the ingredients and the soup are arranged in longitudinal direction, and when soup surface level goes down and a heater is out of contact with the soup, switch of the heater is turned off due to temperature increase, and when switch of the lowermost heater is turned off, alarm is issued or a predetermined quantity of soup with ingredients is automatically injected into the container.

Also, it is designed in such manner that the extrusion rod comprises a rotary cylinder having a cylinder head fitted on tip thereof and a cylinder fitted to and fixed with a rod-like member of the cylinder head protruding from the rear end of the rotary cylinder, and the rotary cylinder is rotatably designed, and the volumetric tube can be smoothly rotated.

The above and other objects and advantages of the invention will become more apparent from the description given below.

DETAILED DESCRIPTION OF THE PREFERRED EMBODIMENT

In the following, description will be given on an embodiment of the present invention.

Figure 1:
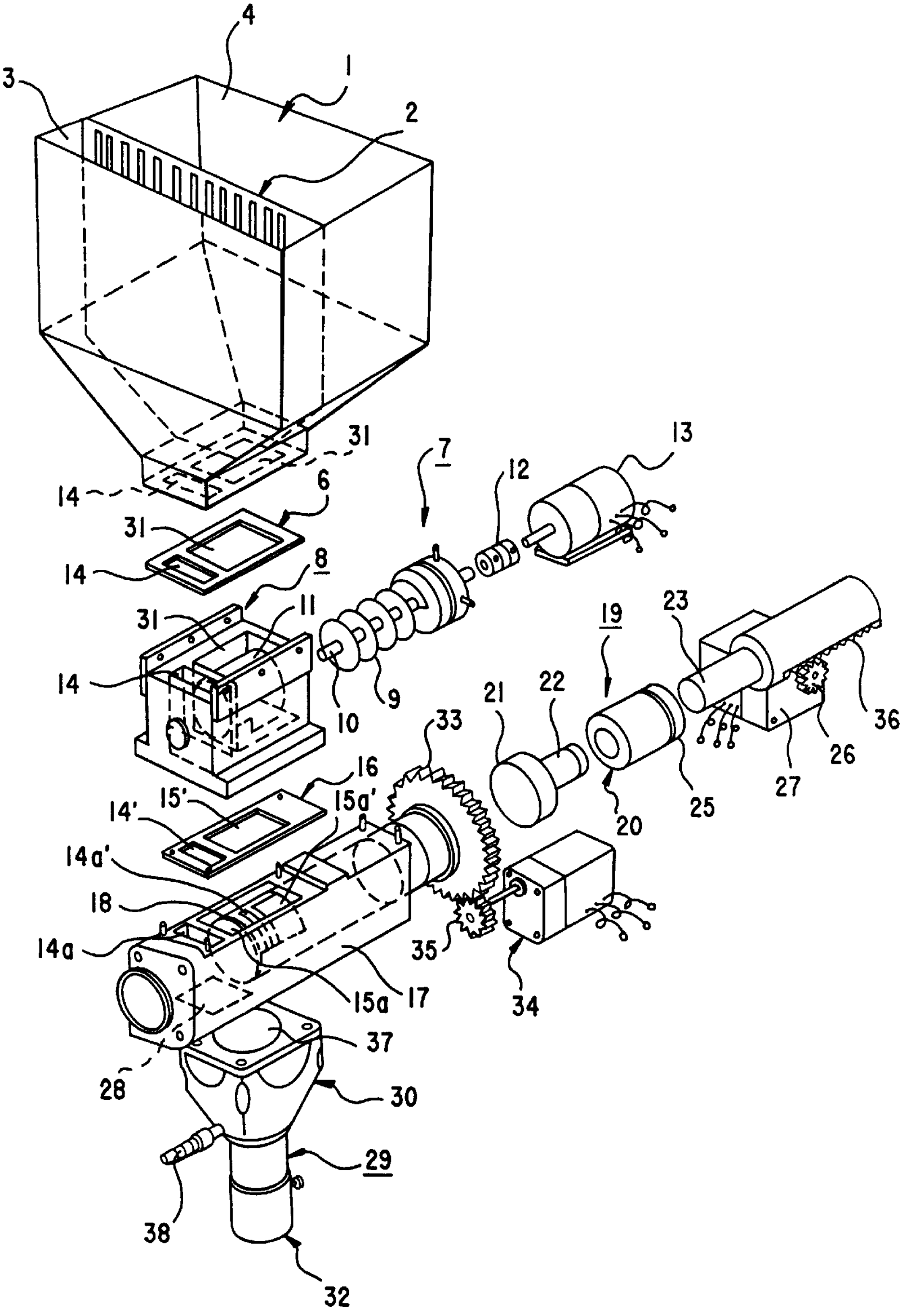
FIG. 1 is an exploded perspective view of an embodiment of the present invention.
Figure 2:
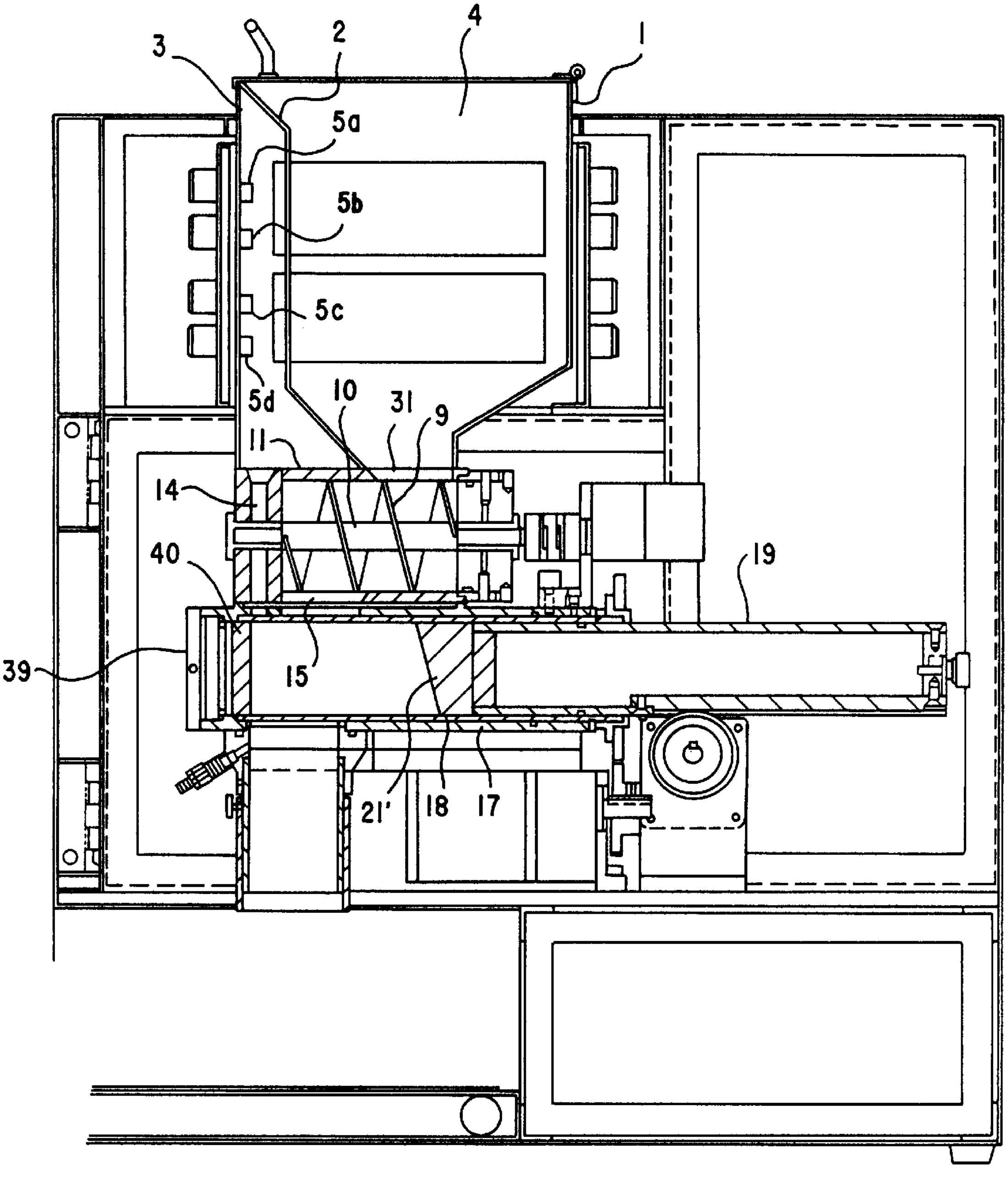
FIG. 2 is a cross-sectional view of the embodiment of the present invention.

FIG. 1 and FIG. 2 each represents an embodiment of the present invention. A container (pot) 1 is separated to a soup accommodating chamber 3 and an ingredient accommodating chamber (soup may be mixed in it) 4 by a stainless steel partition wall 2 erected in longitudinal direction. Soup with ingredients is injected into the ingredient accommodating chamber 4.

By selecting the position of the partition wall 2, it can be designed in such manner that the ingredient accommodating chamber 4 contains only the ingredients, while soup may be contained to some extent.

On the upper end of the partition wall, which the soup does not go through, a screen may be diagonally set, and when the soup is forced to move toward the screen, soup is separated from ingredients by screen. Thus, only the soup enters the soup accommodating chamber and the ingredients go down to the ingredient accommodating chamber through the screen.

It is preferable to heat up the soup to 65 to 100° C., or more preferably to 65 to 70° C., but there is no special restriction on the heating means. For example, outer side of the container 1 may be heated up by heater, or it may be heated by filling hot water into a space between the container 1 and outer tube, or an immersion heater may be immersed into the soup to heat it up. If the soup can be heated to more than 100° C., temperature may be increased to more than 100° C.

However, when the immersion heater is used and if the immersion heater is projected upward from the soup surface into the air, scorching may occur at the site where the immersion heater is projecting. For this reason, the soup should be filled in such manner that the surface of the immersion heater is not exposed above the soup surface.

As shown in FIG. 2, it is preferable to provide a plurality of heaters 5_a_ to 5_d_ to heat up the ingredients and the soup in the soup accommodating chamber of the container because level switch is not required.

The above four heaters are designed in such manner that, when soup surface level goes down and the heaters are out of contact with the soup, temperature is increased and the switch is turned off. When the switch for the lowermost heater **5*d*** is turned off, alarm is issued or a predetermined quantity of the soup with ingredient is automatically injected into the container.

As separating means for separating the ingredients from the soup in the present invention, a plate provided with a multiple of oblong holes or a screen plate as in the above embodiment may be used. However, this may be a sheet-like or plate-like member with a number of openings, through which only the soup can go through, and there is no special restriction.

In the above embodiment, a separator designed as a partition wall is used, while a separator designed in cylindrical shape may be used.

As shown in FIG. 1, the container 1 is removably connected to a housing 8, which is provided with an ingredient volumetric (quantitative allotting) means 7 via a packing 6. In the present invention, the term "housing" 8 also means the lower end of the container. That is, the container 1 and the housing 8 may be integrated or may be separately designed.

The ingredient volumetric means 7 comprises, as shown in FIG. 1 and FIG. 2, a bar-like unit 10 with spiral portion 9 and an ingredient accommodating chamber 11 having semicircular cross-section, which is engaged with a part of the bar-like unit 10 (a part of the spiral portion 9). The ingredient accommodating chamber 11 is fixed on the inner bottom of the housing and its forward end is closed.

It is preferable that the ingredient accommodating chamber 11 with semi-circular cross-section has approximately the same length as an opening 15 formed on the housing 8 at the lower end of the ingredient accommodating chamber as shown in FIG. 2. In this embodiment, a predetermined quantity of ingredients is accommodated within the ingredient accommodating chamber (the opening at its lower end is closed).

The rear end of the bar-like unit is connected to an ingredient volumetric motor 13 via a coupling 12.

When the bar-like unit 10 is rotated by rotation of the ingredient volumetric motor 13, the ingredients are moved forward, and the ingredients are filled into a space with approximately constant volume between the ingredient accommodating chamber 11 and the spiral trough of the bar-like unit 10. In this case, if the number of revolutions of the bar-like unit 10 is controlled by the volumetric motor 13, it is possible to adjust the quantity of the ingredients entering the ingredient accommodating chamber 11.

As shown in FIG. 1, the lower end of the container 1 is communicated with a large opening 31 and a small opening 14 of the housing 8 with the packing 6. The small opening 14 is communicated with the soup accommodating chamber 3 and the large opening 31 is communicated with the ingredient accommodating chamber 4. The soup is dropped through the small opening 14, and the ingredients (ingredients and soup) dropped through the opening 31 are sent down into a volumetric tube through an opening 15 at the lower end of the ingredient accommodating chamber 11.

The housing 8 of the ingredient volumetric means is connected to an oblong tube 17 serving as an outer valve via a packing 16.

On the tube 17 serving as an outer valve, the volumetric tube 18 serving as an inner valve is rotatably and closely engaged, and an extrusion rod 19 is closely fitted to rear portion of the tube 18 so that it can be freely moved back and forth.

The volumetric tube 18 is rotated by rotating a large gear 33 fixed on the rear end of the volumetric tube and by rotating a small gear 35 fixed on rotation shaft of a motor 34.

On the tube 17 and the volumetric tube 18, small openings **14*a* and 14*a*' and large openings 15*a* and 15*a*' are formed respectively at positions aligned with the small opening 14, through which the soup is dropped, and at positions aligned with the large opening 15, through which the ingredients are dropped. The openings 14, 14*a* and 14*a*' and the openings 15, 15*a* and 15*a*' are closely communicated with each other via the packing where the openings 14' and 15'** are formed.

Figure 3:
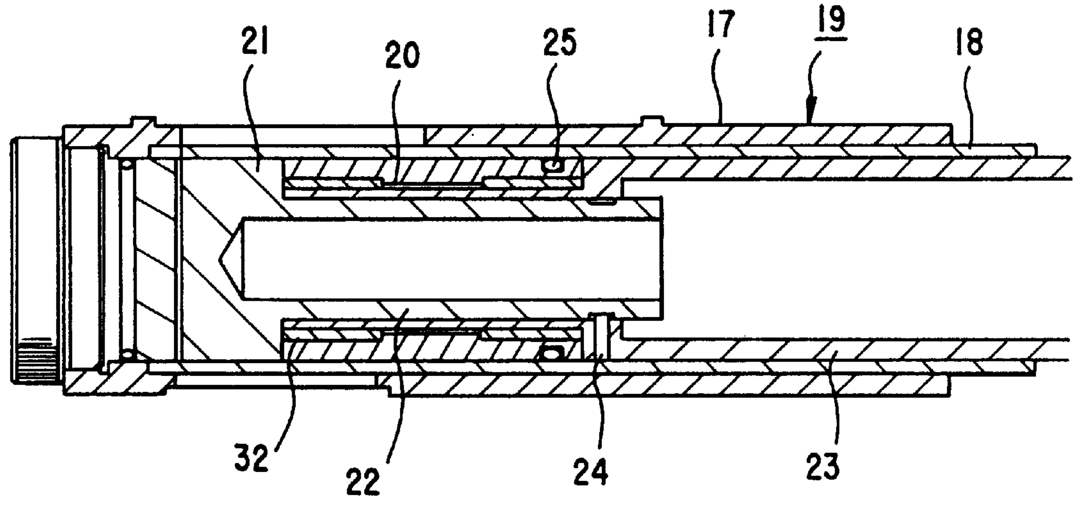
FIG. 3 is a cross-sectional view showing an embodiment of an extrusion rod of the present invention.

In the embodiment shown in FIG. 1, on the extrusion rod 19, a cylinder head 21 is fitted to the forward end of a rotary cylinder 20 as shown in FIG. 3, and a rod-like member 22 of the cylinder head protruding from the rear end of the rotary cylinder 20 is fitted on a cylinder 23.

The rod-like member 22 of the cylinder head and the cylinder 23 are fixed by engaging a pin 24 into the rod-like member 22 from the cylinder 23.

As shown in FIG. 1 and FIG. 3, a ring-like groove is formed on outer periphery of the rotary cylinder 20, and a ring 25 made of elastic material is provided on the groove.

With the arrangement as described above, the rotary cylinder 20 can be rotated. To facilitate the rotation, a bush 32 is fitted on inner peripheral surface of the rotary cylinder 20.

If the cylinder head 21 is made of stainless steel, it may make noise when it hits the tube 17. For this reason, the cylinder head is made of Teflon in the above embodiment.

As shown in FIG. 2, when a metal extrusion rod with the Teflon cylinder head 21' fixed on it is used, the volumetric tube 18 may not be rotated smoothly in case hot soup is used. However, in the arrangement as described above, the rotary cylinder 20 is rotated and the ring made of elastic material is fitted on outer periphery of the rotary cylinder, and the volumetric tube 18 is rotated smoothly even when the soup is at high temperature.

In the embodiment shown in FIG. 2, the forward end surface of the cylinder head 21' is inclined so that its length is decreased from the upper end toward the lower end.

Even when the upper end of the cylinder head contacts the forward end 40 of the volumetric tube 18, it gives no obstacle to the ingredient extrusion rod if the lower end reaches the opening **15*a*** at least, and the ingredients are not crushed. Thus, it is preferable to design in this manner.

In the above embodiment, the extrusion rod 19 is moved forward or backward with the rotation of a gear 26 engaged with a rack gear 36 on the cylinder 23 driven by rotating a motor 27 in normal and reverse directions.

At the lower end of the tube 17, an opening 28 to receive the soup and the ingredients is provided, and this opening is communicated with an opening 37, which is formed on a flange 30 at the upper end of a tube-like discharge nozzle 29.

A tube-like slide nozzle 32 is engaged on the lower portion of the discharge nozzle 29, and it can be moved up and down. The height of the slide nozzle 32 is preferably adjusted depending upon size and shape of a cup or a bowl, to which soup and ingredients are to be allotted.

In the figure, reference numeral 38 represents a cleaning nozzle. By injecting water from the nozzle, the soup and the like attached on inner surface of the discharge nozzle 29 can be removed.

Next, description will be given on a method to use the system of the present invention with the above arrangement.

First, power is turned on, and soup is injected into the ingredient accommodating chamber 4 of the container 1.

Then, the heaters 5$a$ to 5$d$ to heat up the soup in the container 1 is turned on, and the soup is heated up.

When the soup in the container 1 reaches a preset temperature (50° C. in this embodiment), the opening 15 at the lower end of the ingredient accommodating chamber containing a predetermined quantity of ingredients is communicated with the opening 15$a'$ of the volumetric tube. At the same time, the small opening 14 at the lower end of the soup accommodating chamber is communicated with the small opening 14$a'$ in the volumetric tube so that the soup can go through.

Under this condition, the bar-like unit 10 is rotated in reverse direction, and the ingredients are tossed up. The soup is circulated from the container 1 through the small opening 14$a'$, the volumetric tube 18 and the large opening 15$a'$ and it is sent back to the container 1, and the soup is heated up.

In this case, it is preferable that the tip of the cylinder 19 is positioned at the rear end of the opening 15$a'$ of the volumetric tube. In so doing, the soup in the container 1 is stirred up. Thus, temperature can be increased at uniform rate, and scorching can be effectively prevented.

When temperature in the container 1 reaches a preset temperature (80° C. in this embodiment), the heaters are turned off, and stirring of the soup is stopped. When the temperature of the soup reaches a preset temperature (65° C. in this embodiment), the heaters are turned on, and the soup is stirred up in similar manner.

It is preferable to turn to the product serving standby condition by pressing pushbutton when soup temperature is at a preset temperature (65 to 80° C. in this embodiment).

In this case, a cup, to which the soup is to be allotted, is placed under the discharge nozzle 29 (soup outlet).

Soup allotment quantity (150 cc or 200 cc in this embodiment) is selected by pushbutton, and the start pushbutton is pressed.

In this case, if there is no cup under the outlet or if outlet door is opened, it is preferable to design in such manner that this situation is detected by sensor and starting operation can be prevented.

At the time of start, the opening 15 at the lower end of the ingredient accommodating chamber is closed by the volumetric tube 18, and the extrusion rod 19 is positioned at the rear end of the opening 15$a'$ of the volumetric tube. Therefore, the soup is filled in the volumetric tube 18 which is defined by the forward end of the extrusion rod 19.

Then, the ingredient volumetric motor 13 is driven, and the bar-like unit 10 is rotated at a predetermined number of revolutions to move the ingredients forward, and the ingredients are filled in a space of approximately constant volume between the spiral trough of the bar-like unit 10 and the ingredient accommodating chamber 11. When the number of revolutions is decreased, a smaller quantity of ingredients can be accommodated.

Next, the motor 34 is driven to rotate the volumetric tube 18. The opening 15$a'$ of the volumetric tube is communicated with the opening 15 at the lower end of the ingredient accommodating chamber, and the extrusion rod 19 is moved back to such a position that a preset volume (150 cc or 200 cc in this embodiment) of the soup can be accommodated.

In this way, a predetermined quantity of ingredients positioned at the spiral trough flows into the volumetric tube 18.

Then, the volumetric tube 18 is immediately rotated at an angle of 45° by the motor 34, and the opening 15$a'$ of the volumetric tube 18 is aligned with the opening 28 of the tube 17. At the same time, the motor 27 is rotated to move the extrusion rod 19 forward, and the soup mixed with the ingredients is injected into the cup under the discharge nozzle 29.

Next, the extrusion rod 19 is moved back to the initial position, and the volumetric tube 18 is rotated at an angle of 45°. By repeating this procedure, the soup can be automatically allotted.

In case the quantity of the soup in the container 1 is decreased to a preset volume (in case soup surface is moved to lower than the position of the heater 5$d$ in the above embodiment), alarm is issued by lamp or buzzer, and the heater and automatic mode are turned off.

In this case, the remaining quantity of the soup is discharged by pressing a manual pushbutton. The next lot of the soup is injected into the ingredient accommodating chamber of the container 1, and the above procedure is repeated. Naturally, the remaining soup may be not be discharged.

In case the remaining soup is discharged and inner space of the system is to be cleaned up, water or detergent is placed in the container 1, and heaters are turned on. Then, the openings 14$a'$ and 15$a'$ of the volumetric tube are communicated with the openings 14 and 31 at the lower end of the container 1. The bar-like unit 10 is rotated, and the extrusion rod 19 is moved back and forth for a preset period of time. Then, a cap 39 at the forward end of the volumetric tube 18 is removed, and cleaning water is discharged.

In the above embodiment, as shown in FIG. 1, it is designed in such manner that each component parts can be easily separated. This is not always necessary, but in so doing, each parts can be cleaned up separately. This facilitates the cleaning operation of the system, and it is possible to maintain the system always in clean condition.

The system of the present invention can be always applied without any failure in case it is aimed to allot the soup mixed with ingredients such as miso soup, curried soup, and other soup, serving one portion for each customer.

According to the system of the present invention, it is possible to automatically distribute ingredients and soup and to mix them approximately in a preset volume. As a result, it is possible to determine the mixing ingredients always at a constant quantity level and to allot them to one portion (about 180 to 200 cc) for each customer.

If the ingredients and the soup are heated to an adequate level of temperature, e.g. 65 to 70° C., scorching does not occur, and there is also no need to stir up. As a result, there is no need to assign special staffs for the purpose, and it is also possible to prevent the collapse of initial shape of the ingredients.

According to the system of the present invention, food can be boiled in the container 1, and the soup can be prepared directly in the container 1 and it can be immediately allotted and served for the customers.

According to the present invention, it is possible to maintain the quantity of ingredients in the soup to be allotted at approximately constant level and the soup with ingredients can be allotted to one portion for each customer. As a result, the cost to prepare soup can be extensively reduced. Further, scorching of the soup and collapse of the initial shape of ingredients can be avoided.

What is claimed is:

1. A system for allotting soup with approximately constant quantity of ingredients, comprising a container for accommodating said soup with ingredients, means for separating soup and ingredients in said container, means provided at the lower end of said container and used for accommodating a predetermined quantity of ingredients, and an ingredient accommodating chamber provided in said accommodating means and used for accommodating a predetermined quantity of ingredients, whereby said predetermined quantity of ingredients is dropped down through an opening formed at the lower end of said chamber for accommodating the predetermined quantity of ingredients into a space of a predetermined volume positioned thereunder, said opening being opened or closed freely.

2. A system for allotting according to claim 1, wherein a bar-like unit being rotatable and having spiral portion is provided laterally at the lower end of said container, ingredients dropped down to said bar-like unit from above are sent forward by rotating said bar-like unit, said accommodating chamber for the predetermined quantity of ingredients is provided in such manner that the ingredients do not drop from above on the forward portion, and a predetermined quantity of ingredients is maintained between a trough of said spiral portion and said accommodating chamber.

3. A system for allotting according to claim 2, wherein said means for separating said soup from said ingredients is a sheet-like or plate-like member having a multiple of holes, which only the soup can go through, a space in the container is separated to a soup accommodating chamber and an ingredient accommodating chamber by using a partition wall as the means for separating the soup from the ingredients, said partition wall being erected in said container, and said soup mixed with ingredients is injected into said ingredient accommodating chamber.

4. A system for allotting according to claim 1, wherein a plurality of heaters for heating up said ingredients and said soup are provided in longitudinal direction in said soup accommodating chamber of said container, and when soup surface level goes down and a heater is no more in contact with the soup, temperature is increased and switch of the heater is turned off, and when switch of the lowermost heater is turned off, alarm is issued or a predetermined quantity of soup with ingredients is automatically injected.

5. A system for allotting according to claim 1, wherein said space of a predetermined volume is formed by placing an extrusion rod at a predetermined position, said extrusion rod being closely and slidably fitted to an opening at the rear portion of the volumetric tube.

6. A system for allotting according to claim 5, wherein said extrusion rod comprises a rotary cylinder having a cylinder head fitted on tip thereof and a cylinder fitted to and fixed with a rod-like member of the cylinder head protruding from the rear end of said rotary cylinder, and said rotary cylinder is rotatably designed.

7. A system for allotting according to claim 6, wherein a ring-like groove is formed on outer periphery of said rotary cylinder, and a ring made of elastic material is fitted on said groove.

8. A system for allotting according to claim 5, wherein said volumetric tube is rotatably fitted on a tube having an opening communicated with an opening at the lower end of the accommodating chamber for accommodating the predetermined quantity of ingredients, and after the opening formed on said volumetric tube is aligned with the opening of said tube and the ingredients and the soup are moved into the volumetric tube, the volumetric tube is rotated and the opening at the lower end of said container is closed, and a predetermined quantity of ingredients and soup is accommodated in said volumetric tube.

9. A system for allotting according to claim 8, wherein an outlet is provided on the lower portion of the tube having an opening communicated with the opening at the lower end of said container, said outlet is aligned with the opening of said volumetric tube, and by moving an extrusion rod fitted on the volumetric tube in forward direction, the soup-and the ingredients are sent into a predetermined cup or bowl for allotment.

10. A system for allotting according to claim 3, wherein the opening at the lower end of said ingredient accommodating chamber for accommodating a predetermined quantity of ingredients is communicated with the opening of said volumetric tube, a small opening at the lower end of said soup accommodating chamber is communicated with a small opening of said volumetric tube so that the soup can go through, said bar-like unit is rotated in reverse direction to move the ingredients upward, the soup is circulated from said container through the small opening of the volumetric tube, the volumetric tube and through the opening of the volumetric tube and is sent back to the container, while the soup is being heated up to prevent scorching of the soup.

* * * * *